(12) United States Patent
Chandrasekaran

(10) Patent No.: US 7,647,595 B2
(45) Date of Patent: Jan. 12, 2010

(54) EFFICIENT EVENT NOTIFICATION IN CLUSTERED COMPUTING ENVIRONMENTS

(75) Inventor: Sashikanth Chandrasekaran, Belmont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 953 days.

(21) Appl. No.: 10/697,073

(22) Filed: Oct. 29, 2003

(65) Prior Publication Data

US 2005/0097569 A1 May 5, 2005

(51) Int. Cl.
*G06F 9/44* (2006.01)
(52) U.S. Cl. .................. 719/318; 719/313; 719/314
(58) Field of Classification Search ............ 719/310, 719/318, 313, 314; 709/203, 217, 224, 249, 709/223, 227; 707/100; 714/57
See application file for complete search history.

(56) References Cited

U.S. PATENT DOCUMENTS

| | | | |
|---|---|---|---|
| 5,734,903 A * | 3/1998 | Saulpaugh et al. .......... 719/316 |
| 5,819,251 A | 10/1998 | Kremer et al. |
| 5,933,645 A | 8/1999 | Wallack |
| 5,999,978 A * | 12/1999 | Angal et al. ................ 709/229 |
| 6,058,389 A | 5/2000 | Chandra et al. |
| 6,134,559 A | 10/2000 | Brumme et al. |
| 6,182,277 B1 | 1/2001 | DeGroot et al. |
| 6,223,286 B1 | 4/2001 | Hashimoto |
| 6,397,352 B1 | 5/2002 | Chandrasekaran et al. |
| 6,405,191 B1 | 6/2002 | Bhatt et al. |
| 6,405,212 B1 | 6/2002 | Samu et al. |
| 6,449,734 B1 * | 9/2002 | Shrivastava et al. ........... 714/15 |
| 6,477,180 B1 | 11/2002 | Aggarwal et al. |
| 6,487,641 B1 | 11/2002 | Cusson et al. |
| 6,502,093 B1 | 12/2002 | Bhatt et al. |
| 6,523,032 B1 | 2/2003 | Sunkara et al. |
| 6,543,005 B1 | 4/2003 | Bamford |
| 6,547,008 B1 | 4/2003 | Hopper et al. |
| 6,549,916 B1 | 4/2003 | Sedlar |
| 6,574,213 B1 | 6/2003 | Anandakumar et al. |
| 6,617,969 B2 * | 9/2003 | Tu et al. ..................... 340/517 |
| 6,618,805 B1 * | 9/2003 | Kampe ......................... 713/1 |
| 6,678,267 B1 | 1/2004 | Anandakumar et al. |
| 6,697,810 B2 * | 2/2004 | Kumar et al. ................. 707/10 |
| 6,714,976 B1 * | 3/2004 | Wilson et al. ............... 709/224 |
| 6,742,051 B1 * | 5/2004 | Bakshi et al. ............... 719/318 |
| 6,807,583 B2 * | 10/2004 | Hrischuk et al. ............ 719/318 |
| 6,857,064 B2 * | 2/2005 | Smith et al. ................. 712/244 |
| 6,941,557 B1 * | 9/2005 | Jakobson et al. ............ 719/316 |

(Continued)

OTHER PUBLICATIONS

Dieter Gawlick, Oracle Corporation, "Message in a Database Vs Message Enabled Databases," 2004, http://otn.oracle.com/products/aq/htdocs/aq_vs.html?_template=/otn/content/print, data retrieved Feb. 11, 2004, pp. 1-2.

(Continued)

*Primary Examiner*—Van H Nguyen
(74) *Attorney, Agent, or Firm*—Hickman Palermo Truong & Becker LLP; Eric L. Sutton

(57) ABSTRACT

The disclosed techniques for event notification enable applications that rely on event notifications to be ported transparently to clustered computing systems. The disclosed techniques for event notification exploit the characteristics of a clustered computing system and the characteristics of event notification in order to provide efficient event notification in clustered computing environments.

36 Claims, 11 Drawing Sheets

U.S. PATENT DOCUMENTS

| | | | |
|---|---|---|---|
| 6,988,226 B2* | 1/2006 | Koning et al. | 714/57 |
| 7,013,329 B1* | 3/2006 | Paul et al. | 709/217 |
| 7,058,957 B1* | 6/2006 | Nguyen | 719/318 |
| 7,089,250 B2* | 8/2006 | Doganata et al. | 707/100 |
| 7,155,512 B2* | 12/2006 | Lean et al. | 709/224 |
| 7,177,859 B2* | 2/2007 | Pather et al. | 707/3 |
| 2002/0042846 A1* | 4/2002 | Bottan et al. | 709/249 |
| 2002/0095403 A1 | 7/2002 | Chandrasekaran et al. | |
| 2002/0099729 A1 | 7/2002 | Chandrasekaran et al. | |
| 2002/0107892 A1 | 8/2002 | Chittu et al. | |
| 2002/0184216 A1 | 12/2002 | Chandrasekaran et al. | |
| 2002/0194242 A1 | 12/2002 | Chandrasekaran et al. | |
| 2003/0105866 A1 | 6/2003 | Colrain et al. | |
| 2003/0105867 A1 | 6/2003 | Colrain et al. | |
| 2003/0105993 A1 | 6/2003 | Colrain et al. | |
| 2004/0088715 A1* | 5/2004 | Korall et al. | 719/318 |
| 2004/0107387 A1* | 6/2004 | Larsson et al. | 714/39 |
| 2004/0177108 A1* | 9/2004 | Connelly et al. | 709/201 |

OTHER PUBLICATIONS

Mark Craig, et al., Oracle Corporation, "Oracle Workflow Release 2.6.2 Business Event System and PL/SQL Development Guidelines," An Oracle Technical White Paper, Oct. 2001, pp. 1-24.

Oracle Corporation, "Events, Event Logging, and Event Properties," Oracle9iAS Portal PL/SQL API Reference: Events, Event Logging, and Event Properties, http://portalstudio.oracle.com/pls/ops/docs/FOLDER/COMMUNITY/pdk/plsql/doc/pldoc_9026/sdklog1.html, data retrieved Feb. 11, 2004, pp. 1-3.

Oracle Corporation, "Oracle 9i Database, Daily Feature, Smarter Monitoring with Event Schedules and Blackout," 2004, http://otn.oracle.com/products/oracle9i/daily/apr12.html?_template=/otn/content/print, data retrieved Feb. 11, 2004, pp. 1-3.

Nirav Chanchani, Oracle Corporation, "Developer EJB, Understanding Clustering," 2004, http://otn.oracle.com/oramag/oracle/03-jul/043devejb.html?_template=/otn/content/print, data retrieved Feb. 11, 2004, pp. 1-5.

Vineet Busch, Oracle Corporation, "Database Architecture: Federated vs. Clustered," An Oracle White Paper, Mar. 2002, pp. 1-15.

Sohan DeMel, Oracle Corporation, "Oracle9i Real Application Clusters, Cache Fusion Delivers Scalability," An Oracle White Paper, Feb. 2002, pp. 1-24.

Oracle Corporation, "Content Management SDK, Technical Brief: Oracle Content Mangement SDK Message Queuing Framework," http://otn.oracle.com/products/ifs/sample_code/AQ/messagequeueframework.html, data retrieved Feb. 11, 2004, pp. 1-7.

Oracle Corporation, "Oracle9i Application Server, Java2 Enterprise Edition Facilities and Design Considerations," May 2001, pp. 1-36.

* cited by examiner

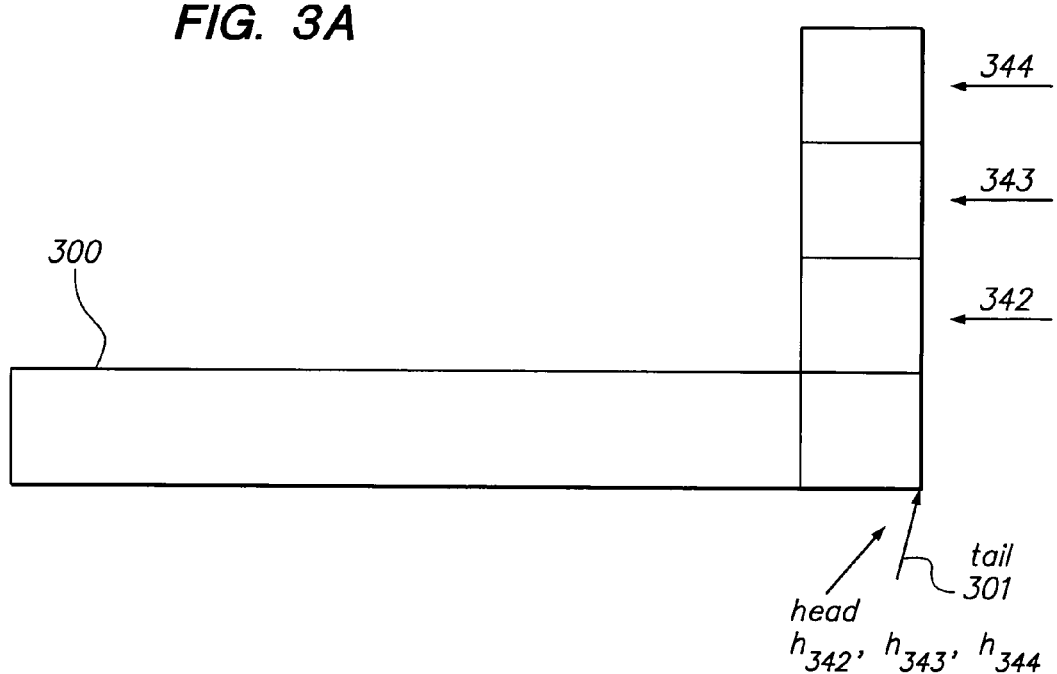
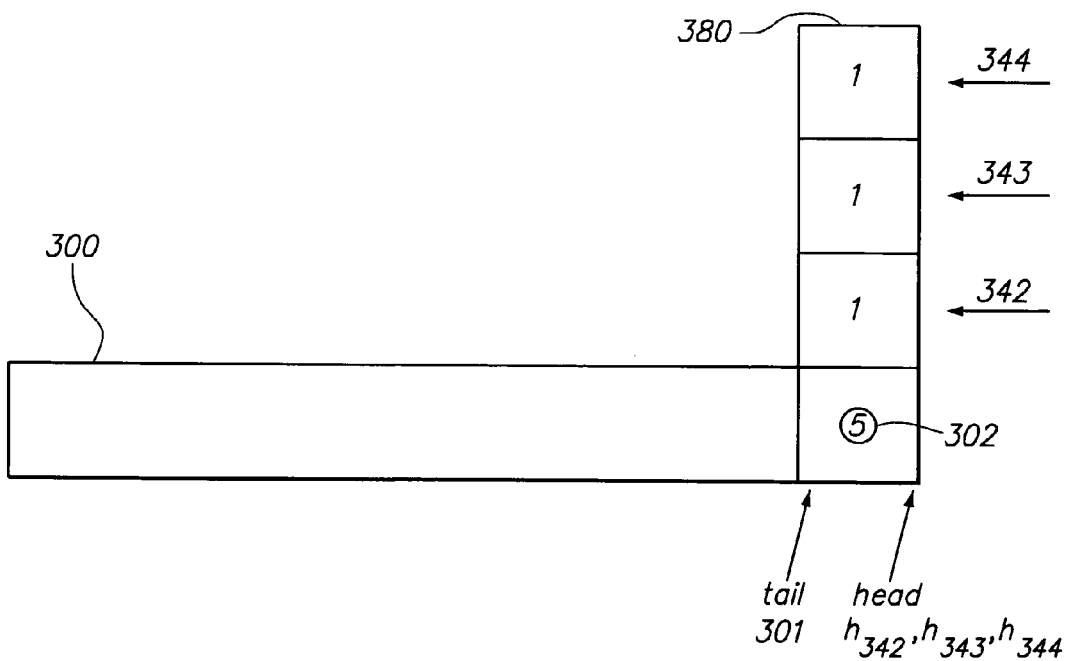

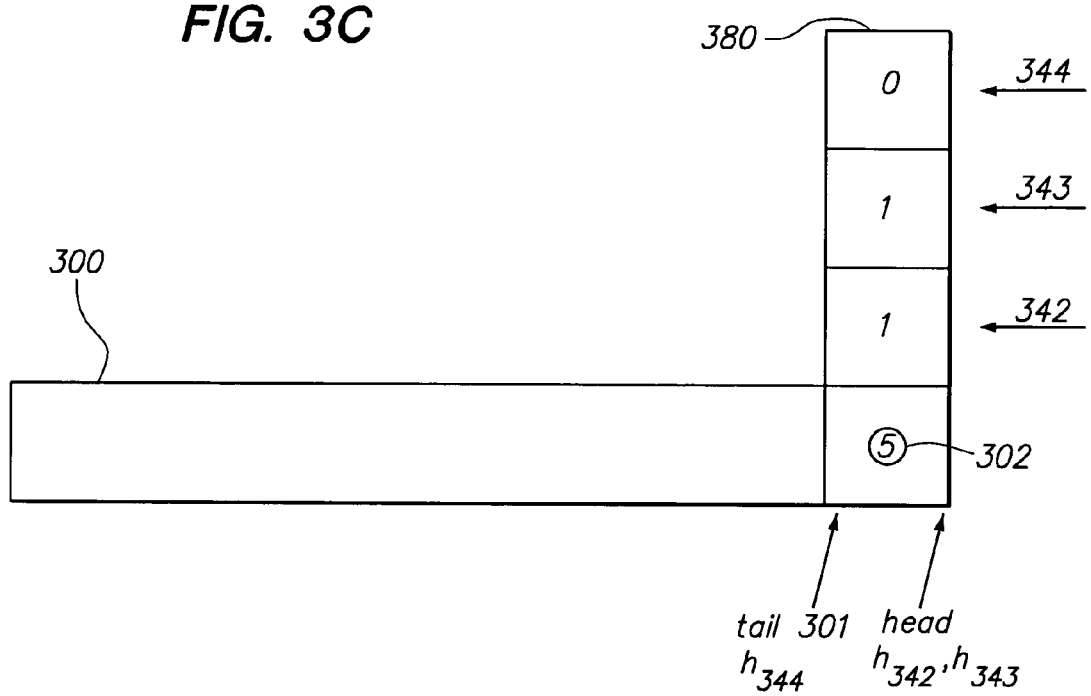
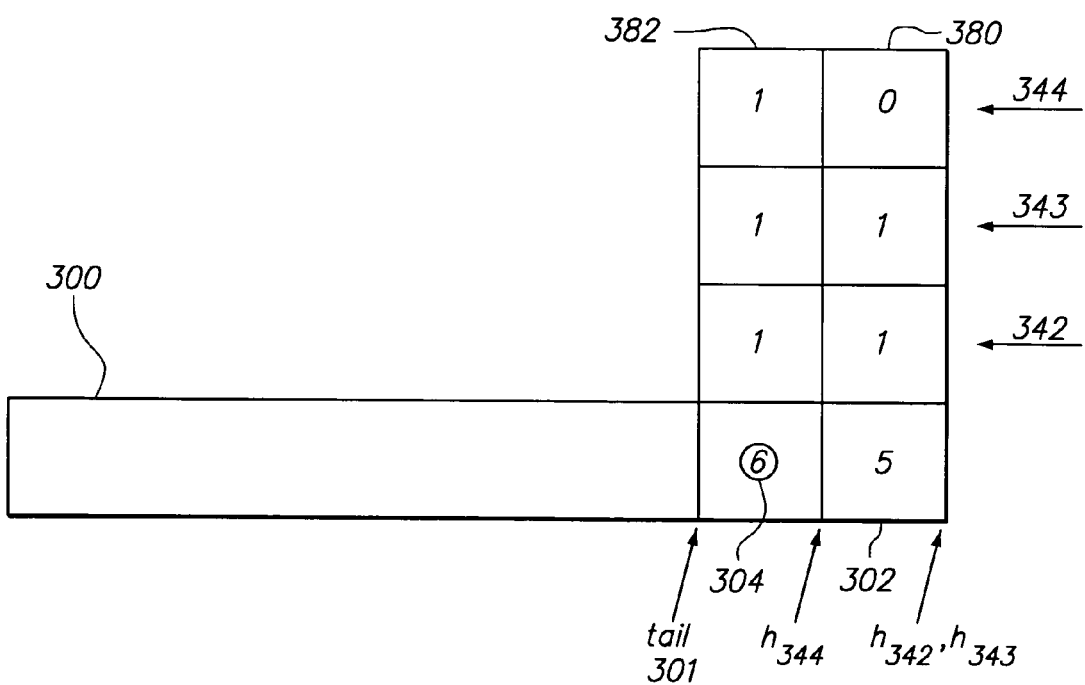

EFFICIENT EVENT NOTIFICATION IN CLUSTERED COMPUTING ENVIRONMENTS

FIELD OF THE INVENTION

The present invention generally relates to event notification in a computer system.

BACKGROUND OF THE INVENTION

Unless otherwise indicated, the approaches described in this section are not necessarily prior art to the claims in this application, and are not admitted to be prior art merely by inclusion in this section.

A cluster is a type of distributed computing system that consists of a collection of interconnected whole computers (nodes) used as a single, unified computing resource. A node is a computer system running a single Operating System (OS) instance. When significant or interesting events occur that change the state of a cluster, this can directly or indirectly affect the applications and services provided by the cluster.

An event, within the context of the present invention, denotes a change in system state, configuration or any other parameter of interest. Users and/or programs that access the computer system often have an interest in these events or in the data, resident in a database system, affected by these events. System users are typically interested in knowing about any system changes that could affect them so that they can take action, if necessary. For example, users and/or programs accessing a database may need notification upon the occurrence of specific system events, such as database startups or shutdowns, when the system is running out of disk space or roll back segments, or on the occurrence of logons and logoffs. Likewise, users could need notification on the occurrence of specific data events, such as when inventory for an item falls below a critical threshold so that items can be ordered in a timely manner. In each case, action can be taken based on such system or data related information extracted or otherwise obtained from the database or computer system.

To improve scalability, databases and file systems may permit more than one database or file server (which may each be running separately) to concurrently access shared storage such as disk media. Each database or file server has a cache for caching shared data. In many software applications, such as databases, processes frequently need to notify other processes that certain events have occurred. Events serve as wake-up mechanisms, and typically, one or more processes may be blocked waiting for an event to occur. Applications that handle a significant number of events are dependent on delivery information and the efficiency of event notification.

Conventionally, most event notification systems are used as part of specific applications or in localized settings, such as a single machine. However, in clustered computing environments, there are many different messages exchanged between nodes for various reasons. For example, in a distributed database system, processes in different nodes will send query parameters and return query results. Part of a query may be executing in one node, and another part of the query may be executing in a different node. In busy clustered computing environments, there are potentially thousands of messages sent between nodes per second. In addition, event notifications are also sent across nodes.

Current event notification techniques present other problems in clustered computing environments as well. For example, whenever an event occurs, a broadcast message is sent to all of the nodes. When a node receives the broadcast message it can notify any process that may be blocked by the event by signaling semaphores using the state saved in the shared-memory within the node. This approach works only if message traffic is low, which is not usual in clustered computing environments. A drawback to sending separate broadcast messages for event notification for all nodes in a distributed system is that the cost of communication for event notification between nodes is high compared to the cost of event notification within one node.

Based on the foregoing, it is desirable to provide improved techniques for efficient event notification in a clustered computer system. These techniques should exploit the characteristics of a clustered system and of event notification in order to provide an efficient event notification in clustered computing environments. It is also desirable to provide techniques that enable applications that rely on event notifications to be ported transparently to clustered computing systems.

BRIEF DESCRIPTION OF THE DRAWINGS

The present invention is depicted by way of example, and not by way of limitation, in the figures of the accompanying drawings and in which like reference numerals refer to similar elements and in which:

FIGS. 3A through 3L are block diagrams depicting states of a circular buffer according to some embodiments of the invention.

DETAILED DESCRIPTION OF THE INVENTION

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are depicted in block diagram form in order to avoid unnecessarily obscuring the present invention. Although headings are provided, information related to a particular heading, but not found in the section having that heading, may also be found elsewhere in the specification.

Functional Overview

The present invention provides several features that can each be used independently of one another or with any combination of the other features. Although many of the features of the present invention are motivated by the problems explained above, any individual feature may not address any of the problems discussed above or may only address one of the problems discussed above. Some of the problems discussed above may not be fully addressed by any of the features of the present invention.

Techniques are provided for efficient event notification in a clustered computer system. According to one aspect or embodiment, existing characteristics of applications running on clustered computer systems and the characteristics of event notification are exploited to provide a more efficient event notification process. According to another aspect or embodiment, techniques for appending event notifications onto existing messages provide efficient event notification across nodes in a clustered computing environment. According to another aspect or embodiment, a priority mechanism is employed in order to optimize efficient event notification across nodes in a clustered computing environment. According to another aspect or embodiment, when an event is generated multiple times the different event generations that have not yet been sent are coalesced into a single event notification before being sent. According to another aspect or embodiment, the event notification is performed by piggy backing the notification on an existing message that may be otherwise unrelated to the notification. According to another aspect or embodiment of the invention the notification and coalescing of the event is performed on a per node basis. According to another aspect or embodiment of the invention, if the event was previously generated and was not yet sent a notification is sent.

Appending Event Notifications to Messages

Figure 1:
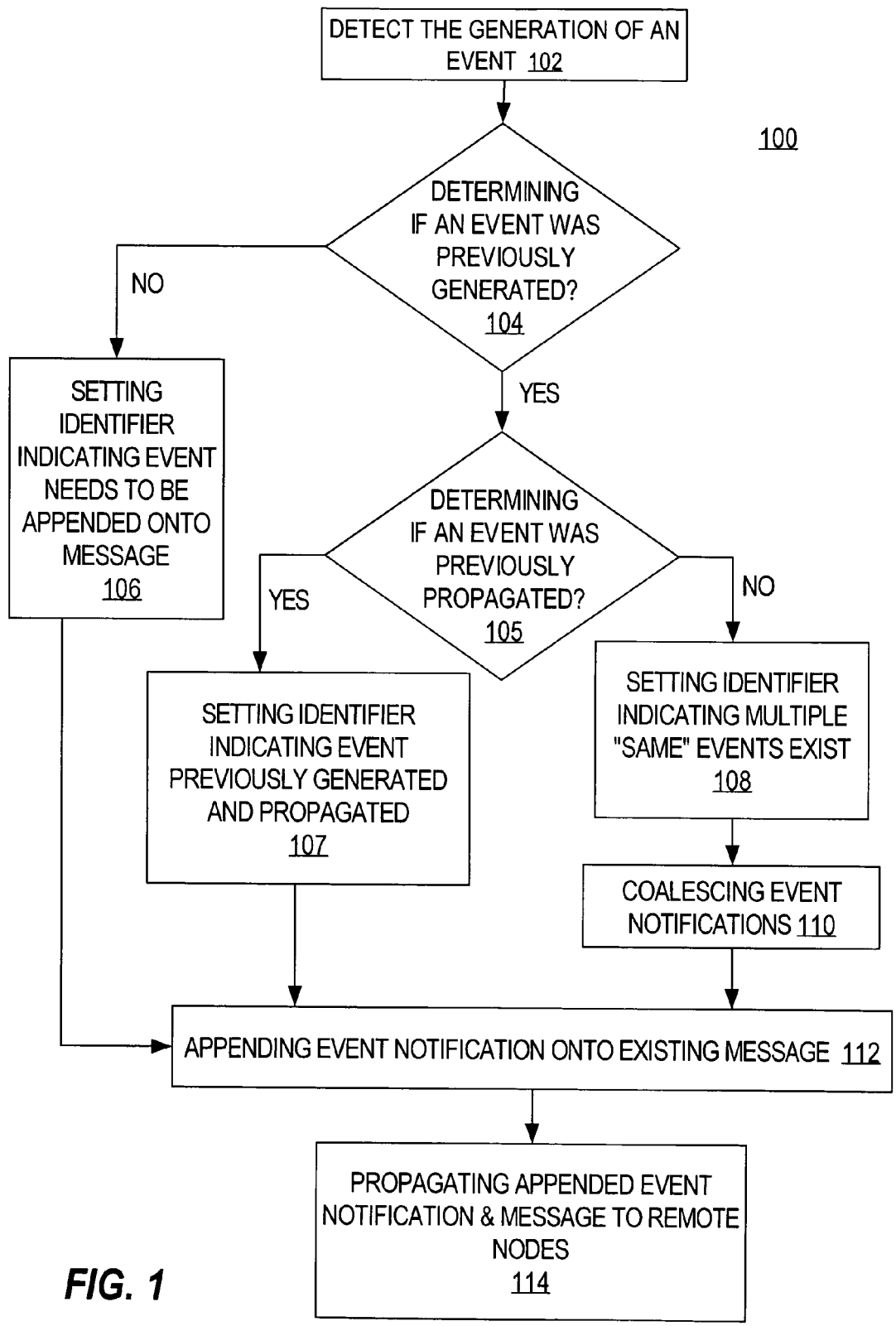
FIG. 1 is a flow diagram that depicts a high level overview of event notification in a clustered computing system according to some embodiments of the invention.

FIG. 1 depicts a flow diagram of method 100 illustrating the major steps by which a server appends event notifications onto existing messages within message traffic for propagation to subscriber nodes in a clustered computing environment according to an embodiment of the invention. At step 102, the generation of an event by a source server is detected. The detection may involve the receipt of an indication such as a signal that the event was generated. At step 104, as mentioned above, a determination is made whether the event was previously generated. If the event was previously generated, method 100 proceeds to step 105, and if the event was not been previously generated, the method proceeds to step 106. At step 106, since at step 104 it was determined that that the event was not previously generated, therefore the identifier at the source server node is set indicating that the event has not been previously generated, and the method proceeds to step 112. At step 112, the event notification is then appended onto an existing message. Next, at step 114, the source server node propagates appended event notification and message data to the subscriber nodes of the clustered computing environment, terminating method 100 at step 114.

Returning to step 104, if it is determined that the event was previously generated, method 100 proceeds to step 105. At step 105, a determination is made whether the event was previously propagated. If the event was not propagated, an identifier is set at the source server node indicating that the event was previously generated (as determined in step 104) and not propagated (as determined in step 105). Before coalescing multiple event notifications to a single event notification, it is desirable to determine that the event has been previously generated (indicating that there is a possibility of sending multiple event notifications) and that the previously generated event has not yet been propagated (indicating that avoiding the sending of redundant event notifications and by coalescing of events is possible). If in step 105 it is determined that the event has already been propagated, method 100 proceeds to step 107. At step 107 an identifier is set indicating that the event was previously generated and was propagated, and the new event cannot be coalesced. Method 100 then proceeds to step 112, where it is appended onto an existing message for propagation in step 114. If in step 105 it is determined that the previously generated event has not yet been propagated, method 100 proceeds to step 108. At step 108, an identifier is set at the source server node indicating that multiple "same" event notifications with the identical event ID and parameter information exist (step 108). In an embodiment, same event notifications are two notifications of the same occurrence of the same event. In an embodiment, same event notifications are notification of different occurrences of the same event. Next, for event notification efficiency, multiple event notifications are coalesced into a single event notification, as depicted at step 110. Next, at step 112, the coalesced event notification can then be propagated onto the subscriber nodes of the clustered computing environment. Also, in step 112 the event notification is then appended onto an existing message, and method 100 continues with step 114, as described above.

Figure 1A:
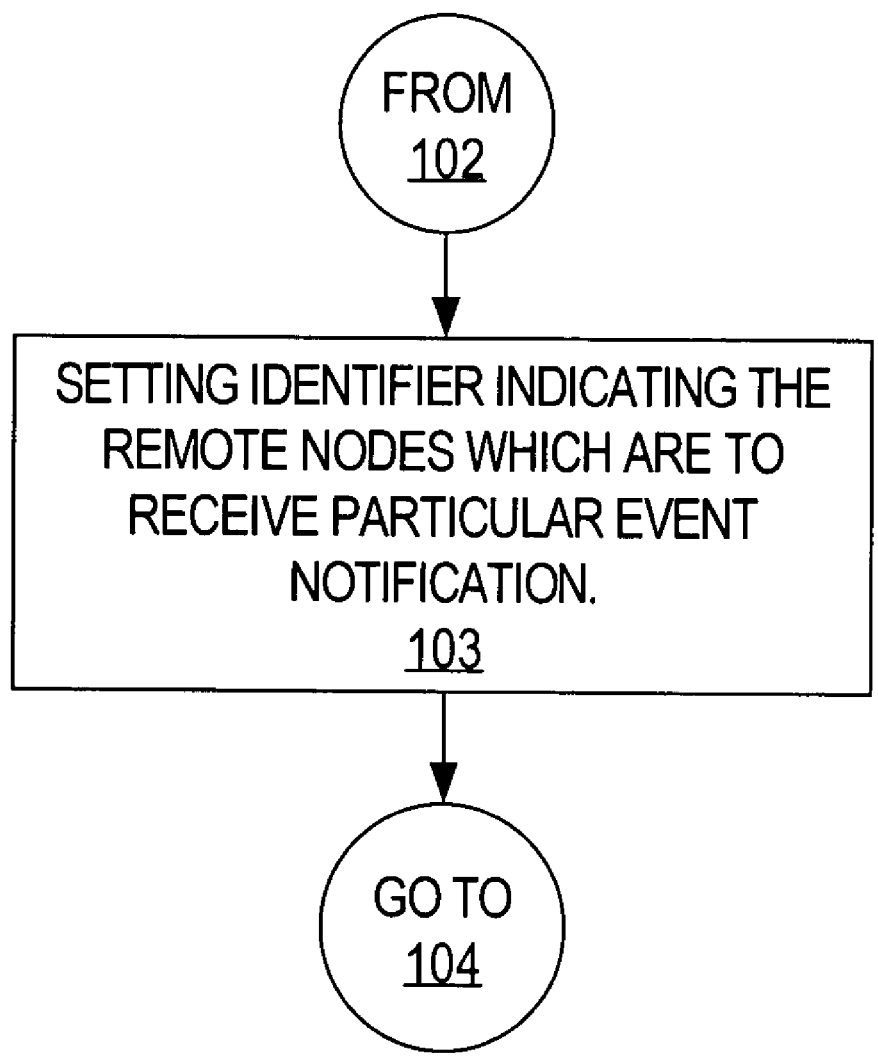
FIG. 1A is a flow diagram depicting an event notification according to some embodiments of the invention.

FIG. 1A depicts method 100A, which is an aspect of some embodiments of the major steps of method 100 described in FIG. 1 in which an identifier is set indicating that an event is to be propagated to a particular node. Specifically, after the event notification is generated in step 102, at step 103 one or more identifiers are set indicating the subscriber node that is to receive a particular event notification. According to method 100A of FIG. 1A, only the subscriber nodes identified as such will receive an event notification. Likewise, incorporating the technique of sending event notifications to particular subscriber nodes with techniques for the coalescing of multiple identical events can be done according to techniques as previously described. After step 103, method 100A proceeds to step 104 of method 100.

Pending event and node address information may be stored in a data structure. A shared memory event buffer may be employed to demonstrate approaches for event notification according to some embodiments of the invention. In order to propagate messages, in for example step 114, existing mechanisms for message propagation to subscriber nodes may be exploited, according to some embodiments of the invention. In the proceeding examples, a circular buffer is employed to illustrate aspects or embodiments of event notification and delivery, according to some embodiments of the present invention. A per node head pointer may be included in the circular buffer so that when any message is sent to a subscriber node, the circular buffer is scanned from the head pointer for this destination to the tail of the buffer looking for the first entry that has a bit set for this destination. According to an embodiment, if such an entry is found, the event notification information is copied into the message, the bit is cleared and the head pointer for this destination is advanced. As each event is processed, the event information is appended onto existing messages of the message traffic and passed to the subscriber node or nodes. Many event notifications can be appended onto existing message traffic. Any given message within the message traffic may have multiple event notifications appended to it, and/or multiple event notifications may appended to a plurality of messages. The procedure is simply repeated for each message and for each event notification appended to the same message. In an embodiment, steps 105, 107, 108, 110, 112, and 114 are performed on a node-by-node basis. In other words, if the same event was propagated to one node and not to another, step 107 will be carried out for the node to which the event has already been propagated, and step 108 is carried out for the node to which the event was not yet propagated. Similarly, in step 112, when a message is ready to be sent to one node, an event notification is appended to it, and event notifications for other nodes for the same event will only be appended to messages to other nodes when other messages going to the other nodes are ready to be sent, which may be sometime later or may never occur.

Circular Buffer

Figure 2:
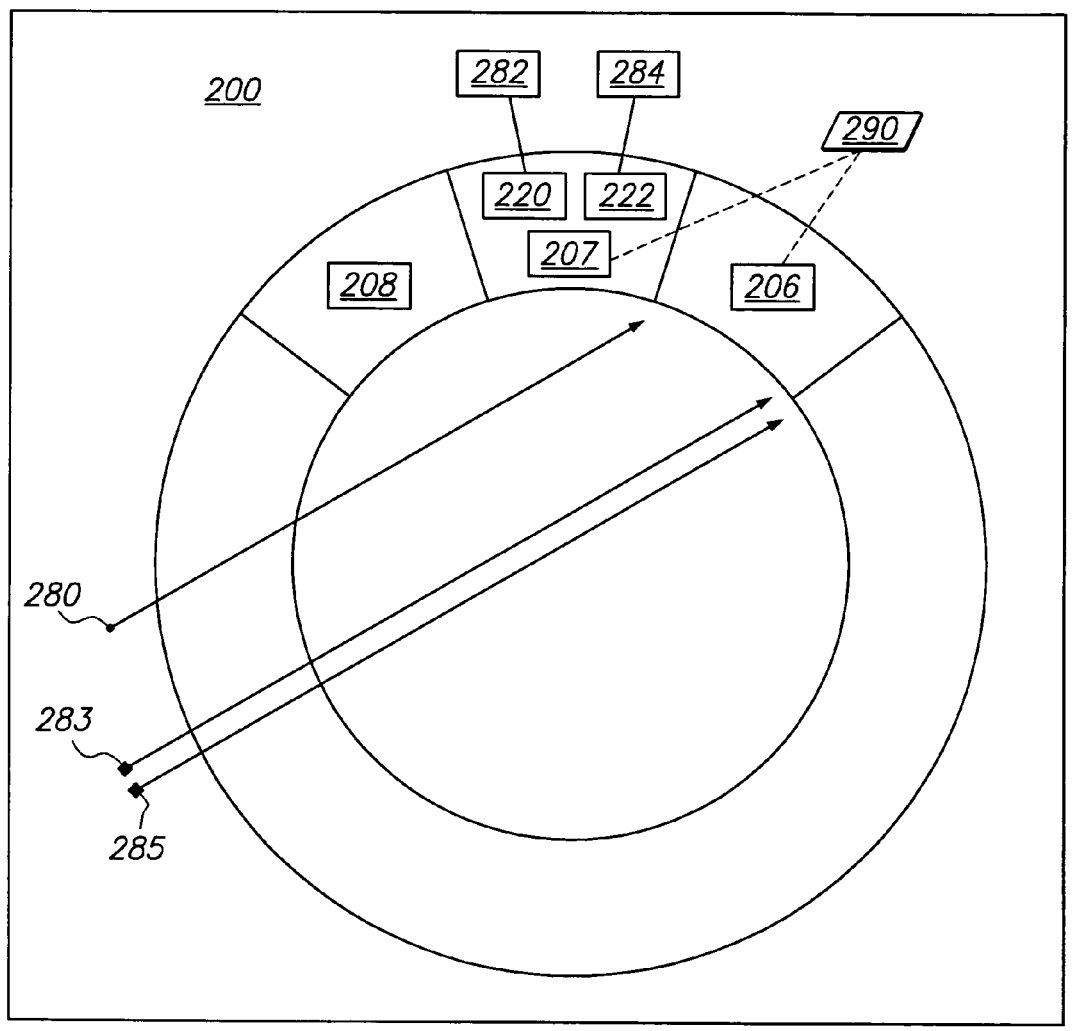
FIG. 2 is a block diagram depicting a high level overview of a circular buffer used for event notification in a clustered computing system according to some embodiments of the invention.

FIG. 2 is a general illustration of a circular buffer 200 with a plurality of event notifications appended onto existing message traffic and propagated. FIG. 2 depicts a three node system, with two subscriber nodes, node 282 and node 284 respectively and existing message 290. Within circular buffer 200, there is a tail pointer 280 and head pointers corresponding to each remote node in the cluster, 283 and 285 respectively. To illustrate the propagation of a plurality of events in a three-node cluster, three events, 206, 207 and 208 are generated and inserted into a data structure within circular buffer 200. In this example, event 207 and 208 refer to the same events. However event 208 is generated after event 207. According to aspects or embodiments of the invention, techniques for efficient notification are described. The following examples represent different actions related to event notification and/or propagation according to aspects or embodiments of the invention:

1) Event notifications are appended onto existing messages of message traffic.

2) Redundant event notifications are coalesced into a single event notification if an event has been previously generated and not yet propagated.

3) Event notifications are propagated only to particular subscriber nodes.

4) Coalescing of event notifications is performed only for particular subscriber nodes for which they are relevant.

Each of the above actions may be used separately or in conjunction with any combination of the other actions. Other actions may be used instead or in addition to any of these four actions.

According to an embodiment, to illustrate appending event notification information onto existing message traffic, during a sweep of circular buffer 200, event 206 is appended onto existing message 290 for propagation to remote nodes 282 and 284. (In this specification, a "sweep" of a buffer refers to any form of search of that buffer).

According to an aspect or embodiment, if an event has been previously generated and not yet propagated, redundant events are coalesced into a single event, and appended onto existing message traffic. Therefore, as illustrated in FIG. 2, during a subsequent sweep, events 207 and 208 are identified as being the same event. Before propagation, the redundant events are coalesced into a single event notification and appended onto message 290 for propagation.

According to an embodiment, for propagation to particular subscriber nodes, an identifier may be set to indicate the particular subscriber node(s) to receive event notifications. For example, in circular buffer 200, node identifiers 220 and 222 contain propagation status information for event 207. Event 207 identifies which of the remote nodes the event is to be propagated to.

Furthermore, if during a sweep of circular buffer 200, it is determined that a particular event has been previously generated and not yet propagated, redundant events may be coalesced into a single event, and appended onto existing message traffic for propagation.

Operational Example of Event Propogation

In an embodiment, space is set-aside in a buffer (e.g., a memory-shared circular buffer which may be referred to as just a circular buffer) for a bit vector at the first occurrence of an event by, for example, partitioning the circular buffer. Initially all the bits in the bit vector are a first value indicative that an event notification needs to be sent. As messages become ready for sending to different nodes the event notifications are appended to those messages, and the corresponding bit is changed to a second value indicating that the event notification does not to be sent to that node. With each indication of an occurrence of an event (even if there already is an entry for an earlier indication of an occurrence of the same event) a new entry is added to the buffer unless the there is an entry in the buffer for the same event that is located between the fastest head pointer and the tail pointer (the fastest head pointer is the head pointer having the fewest bit vectors representing events not yet propagated between the head pointer and the tail buffer). However, if a new occurrence of the same event is received, and if there exists an entry in the buffer that was for the same event and that is located between the fastest head pointer and the tail pointer, then the entry between the fastest head pointer and the tail pointer (which is typically the last entry for the same event in the buffer) is updated according to the new occurrence of the same event rather than create another entry for the same event. With each receipt of an indication of the occurrence of an event, the buffer is searched to see if there was another occurrence of the same event. If there was a second occurrence of the same event, those bits in the second buffer entry for that event that correspond to nodes that have still not been notified are set to the second value, because the bits in the first buffer entry already indicate that an event notification needs to be sent (and still have the first value). The first bit value is assigned to those bits of the second buffer entry corresponding to nodes that have already received event notifications as a result of the first buffer entry for the same event. This will eventually result in these nodes being notified a second time about the same event, which is the desired effect, because the first notification may have occurred a significantly long time ago.

Figure 3E:
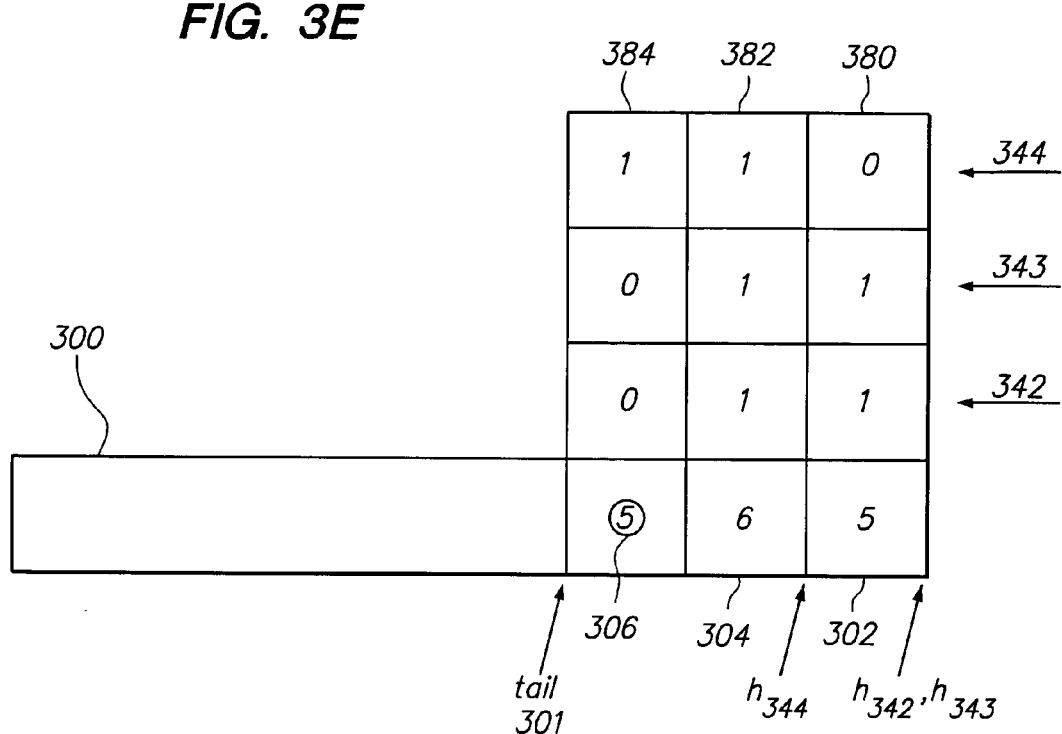

To further illustrate the process steps of event propagation, reference shall be made to FIGS. 3A-3K to describe an operational example employing a circular buffer 300 according to an embodiment of the present invention. FIGS. 3A through 3L, depict a four-node system, with circular buffer 300. According to an embodiment of the invention, bit vectors are employed to store information about the propagation status of event notifications for each remote node. In FIG. 3A, circular buffer 300 is empty. However, the local node is generating events that are to be propagated to the three subscriber nodes 342, 343, and 344. The tail pointer 301 of circular buffer 300 and head pointers (h342, h343, and h344) corresponding to each of the remote nodes (342, 343, and 344, respectively) are initialized. Since the event has not yet been placed in circular buffer 300, tail pointer 301 and head pointers h342, h343, and h344 point to the same position.

In FIG. 3B, a first event 302, having event ID#5, is generated at the local node, and has not yet been appended and propagated to any of the remote subscriber nodes. In FIG. 3B, event 302 has not yet been propagated to any of the subscriber nodes; therefore all bits in bit vector 380 are set to a first value (e.g., "1") for nodes 342, 343, and 344. Tail pointer 301 moves to accommodate bit vector 380, thereby indicating the presence of a notification in circular buffer 300 that needs to still be sent to each of nodes 342, 343, and 344, respectively. Each new bit vector is added to the tail of the circular buffer 300. Event 302 (with ID #5) is then propagated by the local node to a single remote subscriber node, which is node 344. Event 302 has not yet been transmitted to nodes 342 and 343. Therefore, the bits in bit vector 380 remain in their first value (e.g., "1") for nodes 342 and 343, and is changed to a second value (e.g., "0") for node 344. (In the remainder of this example, "1" will be used for the first value, and "0" will be used for the second value. However, the first and second values may be any other pair of two different values.) As shown in FIG. 3C, the head and tail pointer for node 344 is repositioned accordingly. Specifically, head pointers for nodes 342 and 343 (h342 and h343) remain at their starting position, and the head pointer for node 344 (h344), now the fastest head pointer, moves to the same position as tail pointer 301 to indicate that no notification needs to be sent to node 344. A second unique event is generated by the local node, which is depicted in FIG. 3D as event 304 with event ID #6. Event 304 has not been propagated to any of the subscriber nodes, therefore all the bits in bit vector 382 are set to "1". The tail pointer 301 advances accordingly. Since event 304 has not yet been propagated to any of the subscriber nodes (342, 343, and 344), the head pointers (h342, h343, and h344) for the subscriber nodes remain at their respective positions.

In FIG. 3E, to illustrate the introduction of a same event (having event ID#5) that has been previously generated and not yet fully propagated to all subscriber nodes, a third event, event 306, is generated which is identical to a previously generated event, event 302. Specifically, event 306 is the second event that has event ID #5 that was generated by the local node. During a sweep of circular buffer 300, previously generated event 302 with event ID #5 has already been propagated to node 344, but has not been propagated to nodes 343 and 342 as indicted by the "0" in the bit of bit vector 380 corresponding to node 344 and the "1"s in the bits of bit vector 380 corresponding to nodes 343 and 344. Therefore, the bits in bit vector 384 are set to "1" for node 344, and set to "0" for nodes 343 and 342, indicating not to send event 306 to nodes 342 and 343—and to send event 306 to node 344. Since the earlier event (event 302) with event ID #5 is still waiting to be, and presumably will be, propagated to nodes 343 and 342, therefore event 306 does not need to be sent to nodes 342 and 343.

Although event ID #5 was already sent to node 344, since there is no way to tell how long ago the event notification took place, an indication to send it again (e.g., a "1") is placed in the corresponding bit of bit vector 384. The effect of setting the bits in bit vector 384 to "1" for node 344 and to "0" for nodes 342 and 343 is to coalesce the event 306 with event 304. The tail pointer 301 indicates that an event has been generated, and its position is shifted accordingly. The result of coalescing multiple notifications for the same event into a single notification results in optimized event notification, because propagation of redundant event notifications is prevented.

Figure 3F:
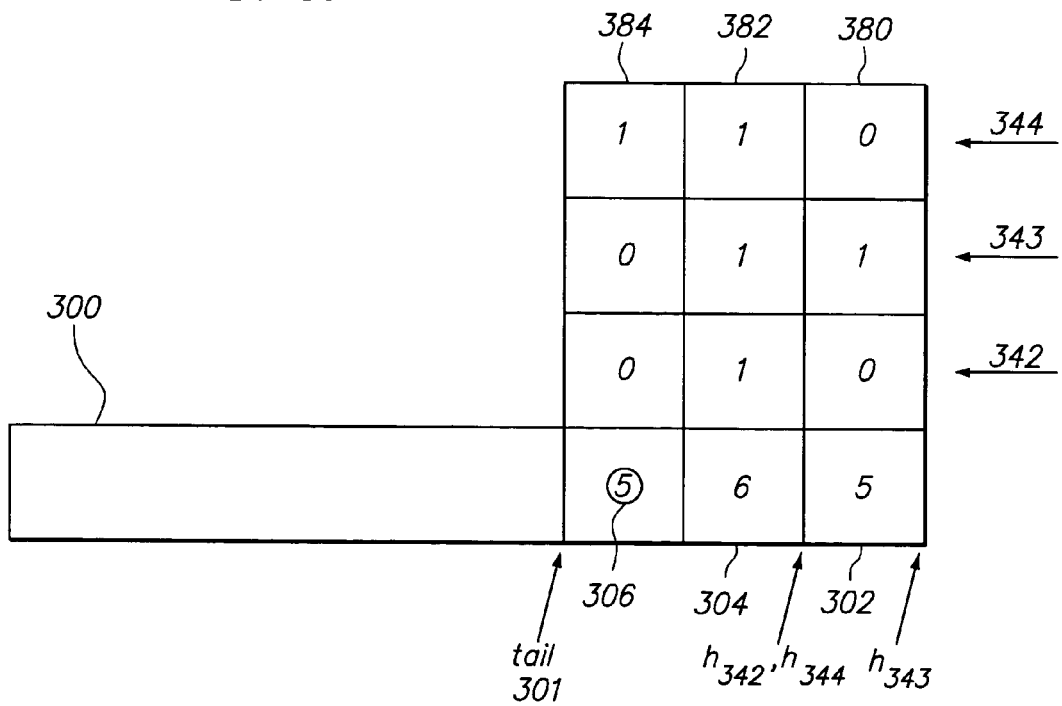

In FIG. 3F, a message is sent to node 342, and event 302 with event ID #5 is appended onto the message and propagated to node 342. When appending an event onto a message, a search is done from the head pointer h342 of the destination node for this message to the tail of the circular buffer looking for entries which have an identifier ("1") set in an event entry for the destination node. As illustrated in the FIG. 3F at bit vector 380, event 302 with event ID #5 is propagated to node 342 and the bit is set to "0". Accordingly, the head pointer h342 for node 342 is advanced as the appended event notification with event ID #5 is propagated to remote node 342.

Figure 3G:
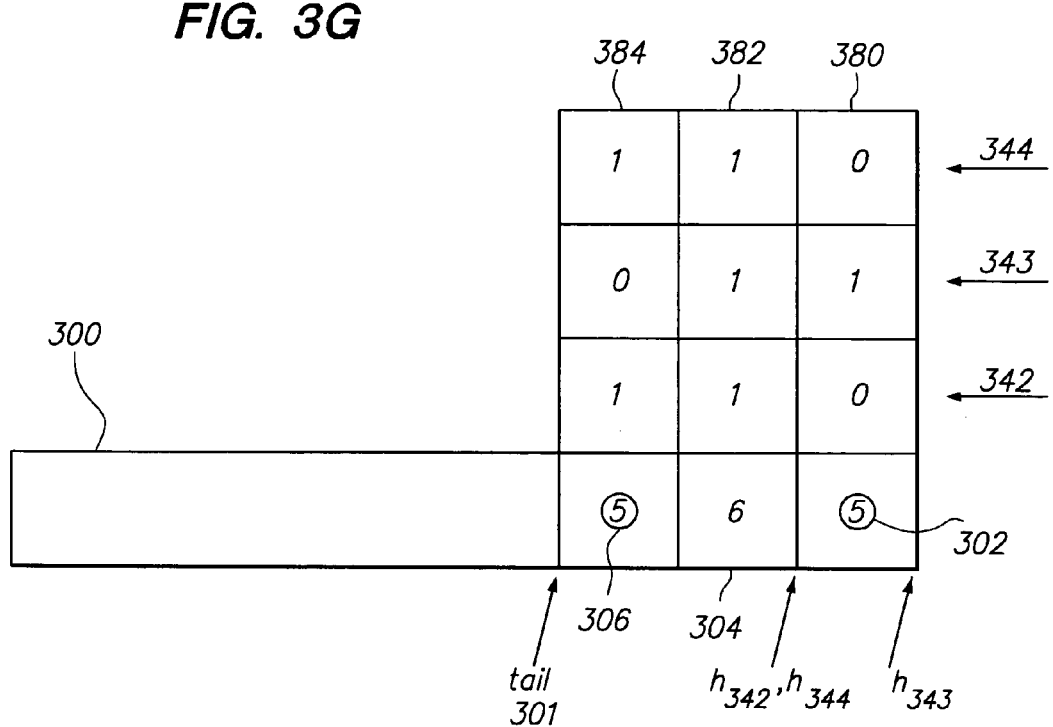
Figure 3H:
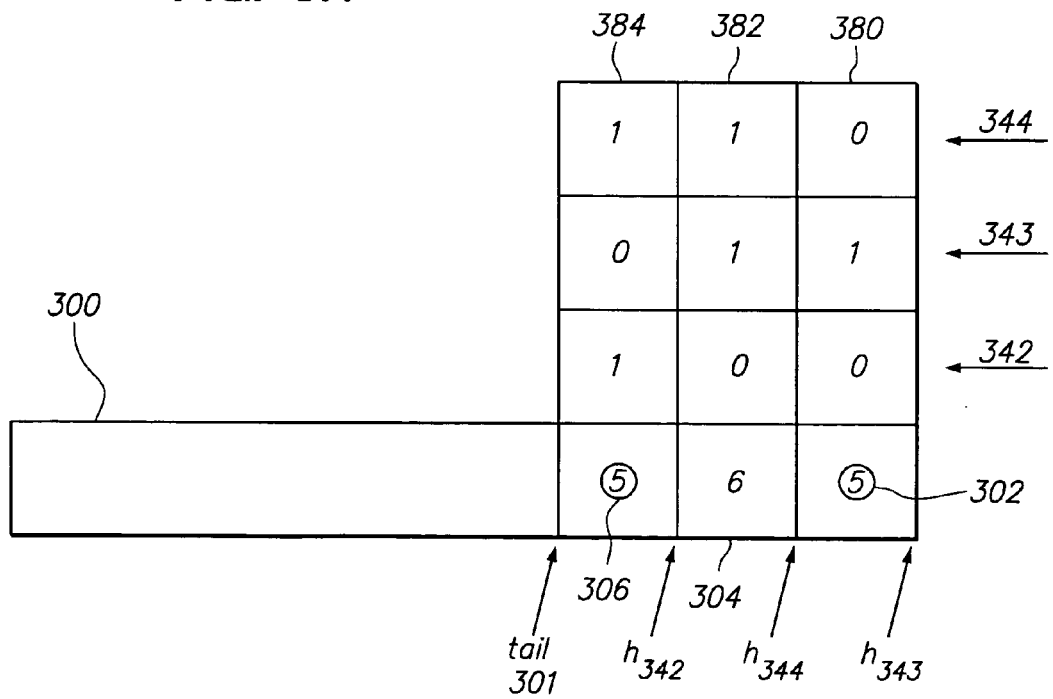

FIG. 3G illustrates a third generation of an event, event ID #5, which has been previously generated as events 302 and 306 for another node in the cluster. A sweep of circular buffer 300 reveals that between the fastest head pointer, head pointer h342, and tail pointer 301 there already exists an entry in circular buffer 300 (event 306) that has event ID #5. Consequently, rather than creating a third entry for event ID #5, the last entry for event ID #5, event 306, is modified. Therefore, as illustrated at bit vector 384, the bit corresponding to node 342 is set to "1", indicating that event 306 with ID #5 has not yet been propagated to node 342. The bit in bit vector 384 corresponding to node 344 remains at "1", indicating that event 306 has not been propagated to node 344. Accordingly, the head pointers for nodes 342, 343, and 344 remain at their previous positions. FIG. 3H illustrates a previously generated event, event 304 having event ID #6, being appended onto an existing message and propagated to a single node, node 342. Since the event 304 is propagated to node 342, therefore the head pointer h342 for node 342 is advanced accordingly and the bit corresponding to node 342 in bit vector 382 is set to "0" indicating that event 304 has been propagated to node 342.

Figure 3I:
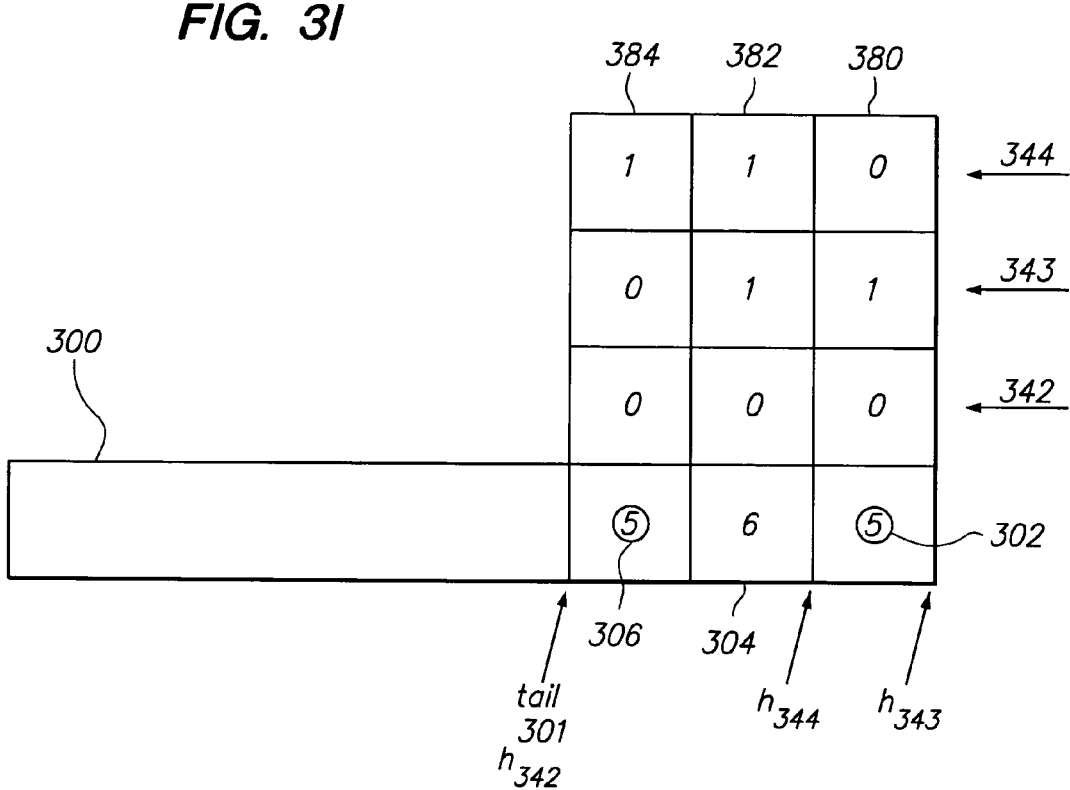

FIG. 3I depicts the state of the circular buffer 300 when all events (302, 304, and 306) are fully propagated for a particular node, node 342. In FIG. 3I, a message is sent to node 342 and event 306 with an ID of 5 is propagated to node 342 by being piggy backed on that message. Accordingly, the bit in bit vector 384 corresponding to node 342 is set to "0", indicating that the event has been propagated to node 342. The head pointer h342, therefore, for node 342 is advanced, and as depicted in the FIG. 3I, is at the same position as tail pointer 301.

When yet another same event is generated, the events are coalesced for subscriber nodes that have not yet been propagated, avoiding the redundancy of propagating events that have been previously generated and have not yet been propagated. For example, assume that a process is blocked on a persistent queue waiting for a message. When an event is generated, the process that generated the event (or otherwise determined that the event has occurred) attempts to insert the event identifier and any parameters into a circular buffer. In addition, the process notifies any processes in the same computer that may be blocked or otherwise affected by the event.

Figure 3J:
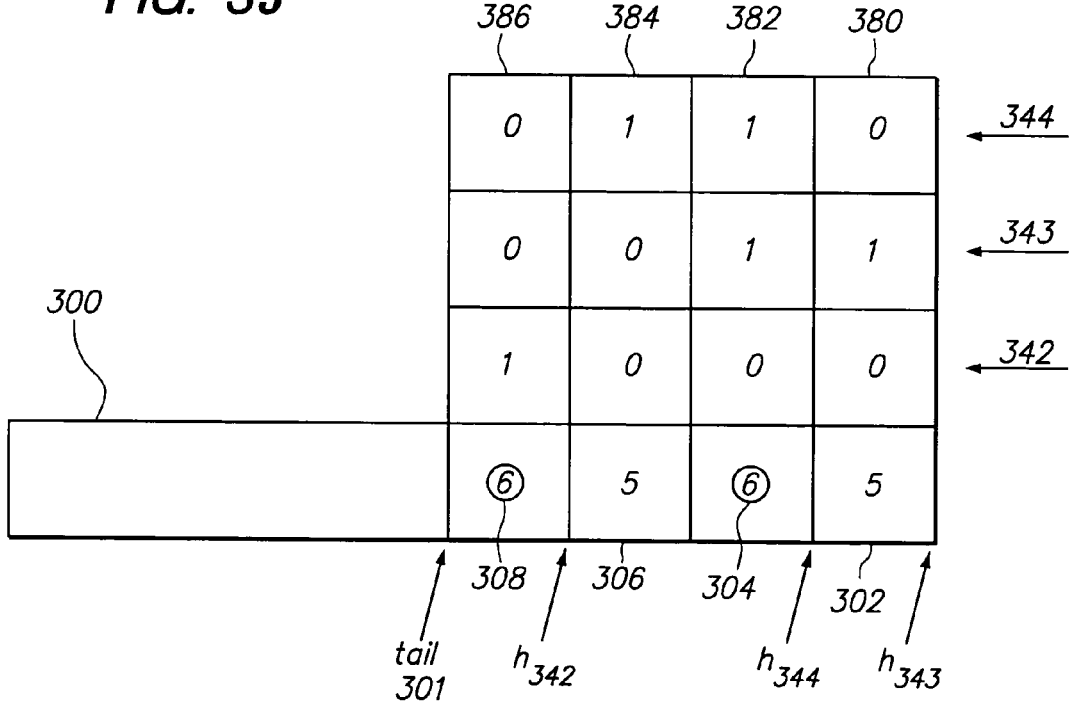

As illustrated in FIG. 3J, a new event 308 with event ID #6 is generated at the local node. During a sweep of circular buffer 300 at bit vector 382, it is determined that event 304 with event ID #6 has not yet been propagated to nodes 344 and 343. Therefore the corresponding bits in bit vector 382 remain at "1". At bit vector 386, the corresponding bits are set to "0" for nodes 344 and 343, because event notifications corresponding to event 304, having event ID #6, have not yet been sent to nodes 344 and 343.

Figure 3K:
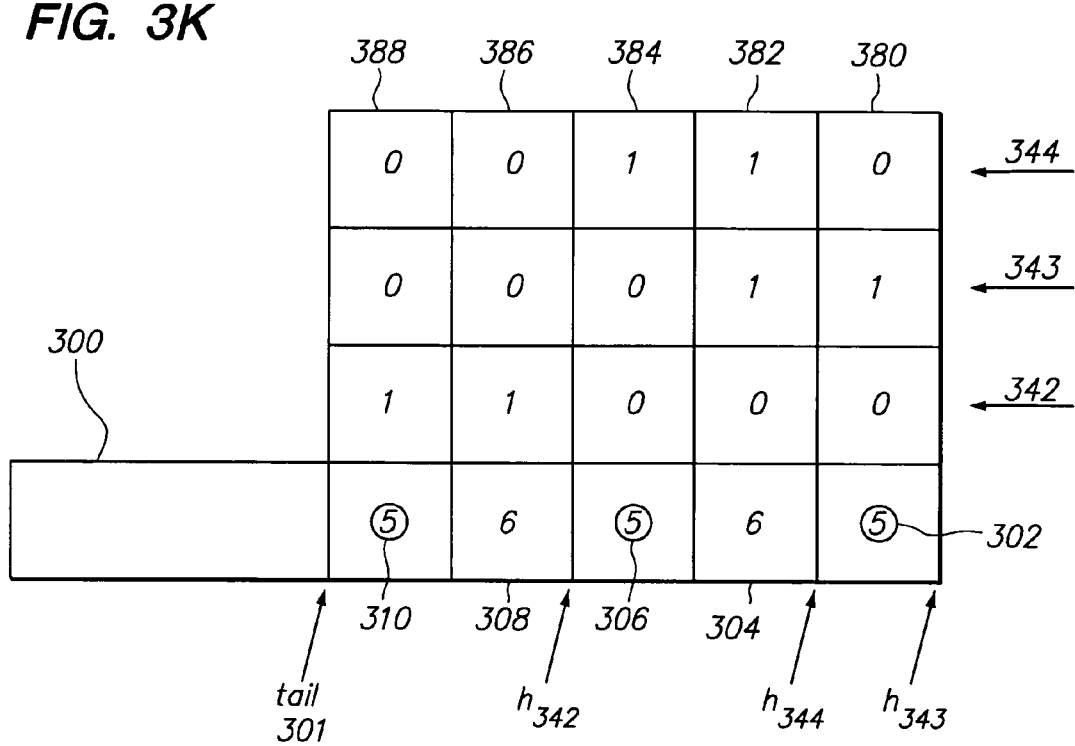

FIG. 3K depicts an example of multiple "same" events (i.e., four events that are the same, event 302 (once), event 306 (twice), and event 310 (once)) with event ID #5 being coalesced for a particular node, (node 342). In FIG. 3K, assume that another event, event 310, with event ID #5 is generated and enqueued. In a sweep of circular buffer 300, an event with event ID #5 is not found for node 342, and therefore the bit vector 388 is set to "1". At bit vector 384, node 344 is awaiting propagation of an event, event 306, with event ID #5. Since node 343 depicts event 302 with event ID #5 awaiting propagation at bit vector 380, bit vector 388 will not add redundancy, the corresponding bit of bit vector 388 is set to "0" so that event 310 is not sent. Therefore, bits corresponding to nodes 343 and 344 in bit vector 388 will be set to "0". This example demonstrates that coalescing of an event will continue until the event has been propagated.

Figure 3L:
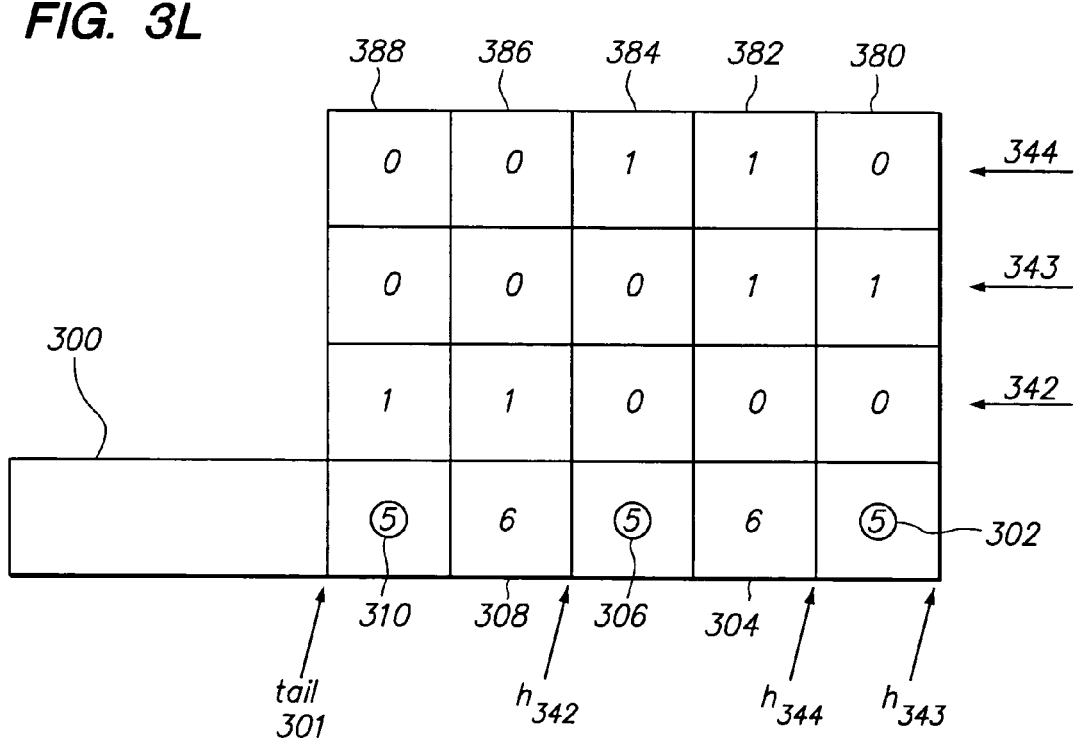

In FIG. 3L, another event having event ID #6 is generated (making three events having event ID #6), since there is already bit vector between the head pointer h342 (the fastest head pointer) and tail pointer 301, which is bit vector 308, a new bit vector does not need to be created. Since no event notifications have been sent having event ID #6 from the time that bit vector 386 was created (in FIG. 3J) until now, therefore bit vector 386 is already up to date and does not need any updating.

As depicted in the operational example, an event with event ID #5 has been generated four times (once as event 302, once as event 310, and twice as event 306). However, with the optimization of appending event notifications onto existing traffic and coalescing the events results in use of only three slots in shared circular buffer 300 are needed. Similarly, although three events having event ID#6 (one event for bit vector 304 and two events for bit vector 308) were generated only two bit vectors are needed. In contrast, an implementation that employs separate circular buffers and no coalescing, twelve slots in the circular buffer would be necessary for event ID #5. In another implementation, the use of separate circular buffers with coalescing would use six slots for event ID #5, one for Node 343, two for Node 344 and three for Node 342.

In an embodiment, characteristics of applications running on clustered computer systems, and characteristics of event notification are utilized to support techniques for efficient event notification. In an embodiment, event notifications are appended onto existing message traffic. In a clustered computing environment, nodes already communicate frequently through message exchange. In a typical clustered computing environment, there may be thousands of messages going back and forth between nodes per second. A benefit of some embodiments of the present invention is that appending event notifications onto existing message traffic is sufficiently fast for most clustered computing applications because event notifications can be done as quickly as messages are transmitted.

Another benefit of aspects or embodiments of the present invention is that appending event notifications onto existing message traffic does not result in a substantial increase in existing message size. Messages are typically hundreds of bytes in size. Event notifications are small, fixed-length values. Usually, an event may be assigned a value that is just a four bytes long. Since event notifications are so small in comparison to typical message sizes, appending event notifications onto messages in existing message traffic is desirable, because it consequently does not substantially increase the size of existing messages. Therefore, appending event notifications to messages does not cause processing delays. Yet, another benefit of some embodiments of the invention is that techniques that are provided to prevent propagation of redundant event notifications to subscriber nodes by optimizing the process of propagating appended event notifications onto existing message traffic.

Variations

Several variations of the described techniques for efficient event notification may be employed depending on the desirable tradeoff of space versus time, and/or on the number of nodes in the system. Common to these variations is that event notifications may be appended onto at least one or more of the messages in existing message traffic. Optionally, event notification may also be performed by sending messages that are specific for that node containing only the event notification in addition to the event notifications that are appended onto other messages. In other words, in an embodiment some event notifications are piggy backed onto existing messages and some are not piggy backed, but sent in another manner.

In many cases, the same event notification data is sent to multiple subscribers. For example, techniques associated with broadcast, anycast, and multicast may be employed for propagation of appended event notifications. In the case of anycast, appended event notifications are transmitted from a single sender to the nearest of a group of receivers. Broadcast refers to sending appended event notifications to all remote nodes in the cluster. In the case of multicast, the appended event notifications are transmitted to a select group of subscriber nodes. A notification that contains an aggregation of several subscribers that are identified to receive identical data is referred to as a multicast notification. Optimizing notification and delivery can increase the performance of applications, for example, by reducing processing load on the distributing node.

Additionally, event notifications need not be enqueued if there is already a pending notification for the same node. For example, at the expense of more memory, an in-memory hash index may be built to lookup if an event exists in the circular buffer. Similarly, the circular buffer may be partitioned using the event identifier to reduce contention while accessing the buffer. When the event is generated, an entry is inserted into the appropriate circular buffer. Therefore, when a message is sent, the message can be round-robinned among the circular buffer entries, appending event notifications onto existing message traffic from each entry in turn.

Another alternative would be to employ a fixed-size messaging technique. For example, a buffer size could be fixed. According to an aspect or embodiment, since the buffer size would be fixed, the free space would be pre-determined and events would be coalesced and event notifications could be appended onto existing message traffic until the free space is filled. Furthermore, many notifications could be appended onto a message, and the procedure would be repeated indefinitely. For example, if a message is about to be sent to a particular node, all the event notifications that have not been sent to that node or that need to be sent to that node could be appended to that message. Yet another variation is the employment of a priority queuing mechanism in order to determine priority for events. High priority events would supercede low priority events in the notification queue. Thus, if for example limited space is available for appending event notifications to a message that is ready to be sent, the high priority event notifications would be appended before the low priority notifications. In some embodiments, the priorities of certain types or of all types of event notifications may be increased according to how long it has been waiting and/or what other processes and/or events have occurred or are in process. In some embodiments, high priority event notifications may not wait for a message to be ready and are sent without piggy backing. In some embodiments, high priority and/or low priority messages may be sent without piggy backing after they have been waiting beyond a certain amount of time.

Hardware Overview

The approach for event notification in clustered computing systems described herein may be implemented in a variety of ways and the invention is not limited to any particular implementation.

Figure 4:
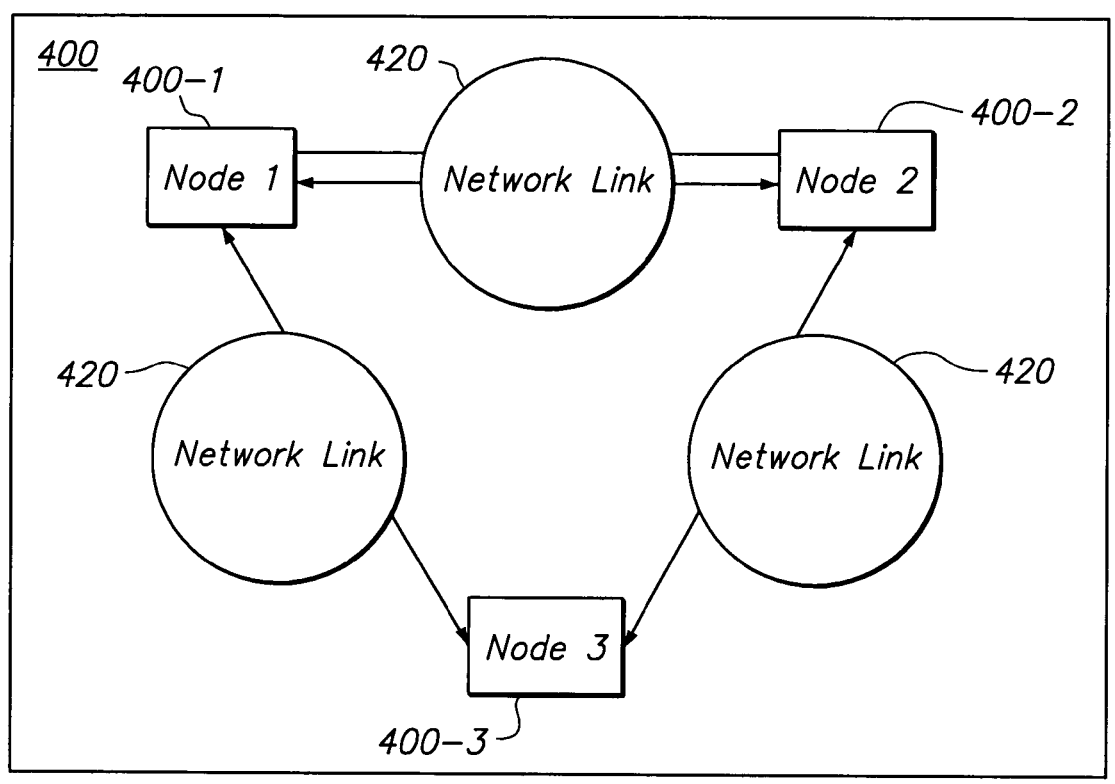
FIG. 4 is a block diagram that depicts a clustered computer system upon which some embodiments may be implemented.

FIG. 4 is a block diagram that depicts nodes in a clustered computing environment 400. Clustered computing environment 400 includes nodes 400-1, 400-2, and 400-3 connected by network link 420. In alternative embodiments, clustered computing environment 400 may not have all of the components listed above or may have other components in addition to or instead of those listed above.

An embodiment of the invention may be implemented upon nodes 400-1, 400-2, and 400-3 of clustered computing system 400. A node in a distributed system acts as a client, a server, or both, depending on the situation. Between nodes 400-1, 400-2 and 400-3 there is two-way data communication via network link 420. Event notifications may be appended to messages being sent on network link 420 between nodes 400-1, 400-2, and 400-3.

Figure 5:
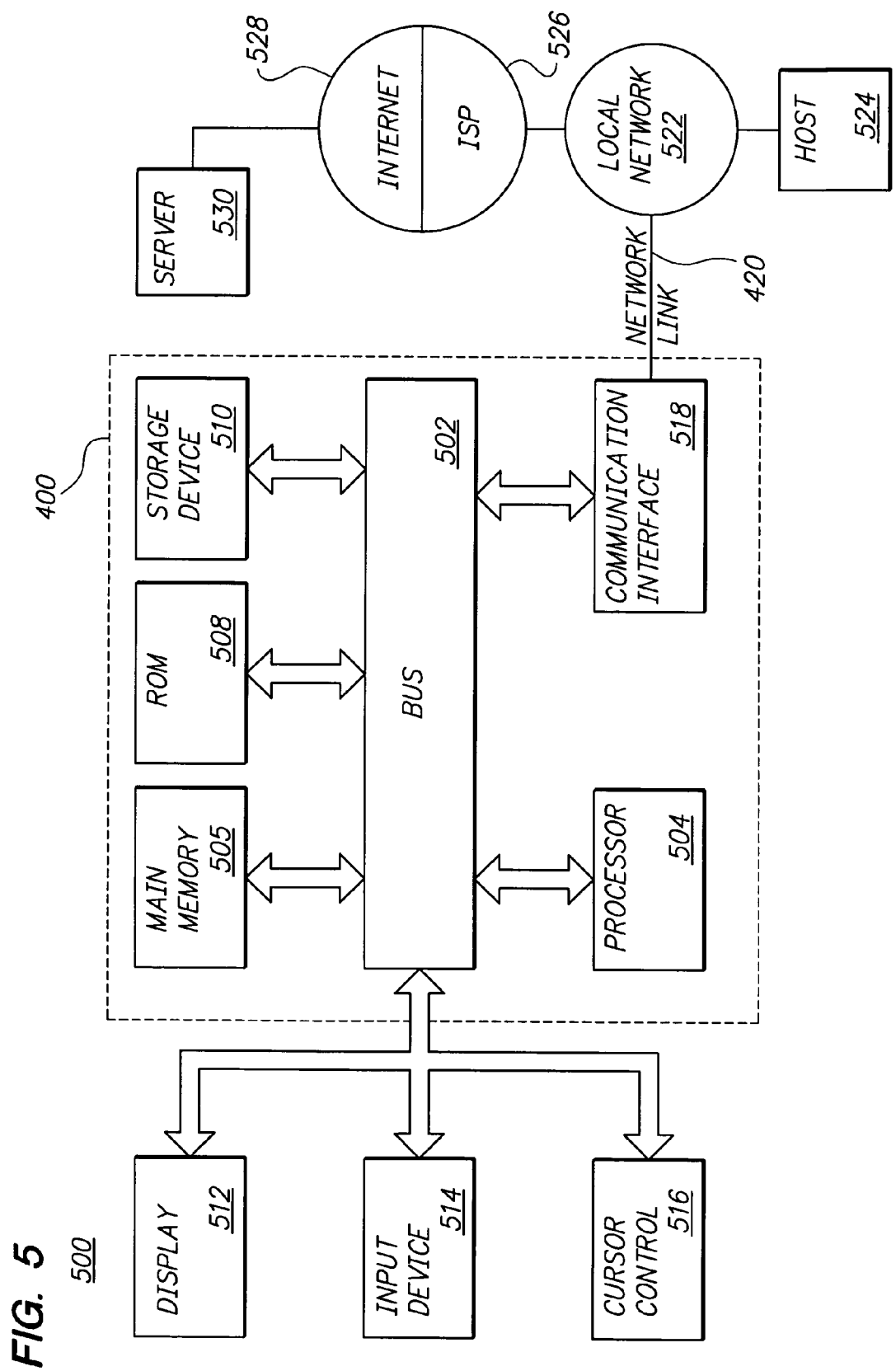
FIG. 5 is a block diagram that depicts a computer system upon which some embodiments may be implemented.

FIG. 5, depicts a computer system 500, which includes a bus 502 or other communication mechanism for communicating information, and a processor 504 coupled with bus 502 for processing information. Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

The invention is related to the use of computer system 500 for implementing the techniques described herein. According to one embodiment of the invention, those techniques are performed by computer system 500 in response to processor 504 executing one or more sequences of one or more instructions contained in main memory 506. Such instructions may be read into main memory 506 from another computer-readable medium, such as storage device 510. Execution of the sequences of instructions contained in main memory 506 causes processor 504 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio-wave and infra-red data communications. Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read. Various forms of computer readable media may be involved in carrying one or more sequences of one or more instructions to processor 504 for execution. For example, the instructions may initially be carried on a magnetic disk of a subscriber computer. The subscriber computer can load the instructions into its dynamic memory and send the instructions over a telephone line using a modem. A modem local to computer system 500 can receive the data on the telephone line and use an infrared transmitter to convert the data to an infrared signal. An infrared detector can receive the data carried in the infrared signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 420 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 420 typically provides data communication through one or more networks to other data devices. For example, network link 420 may provide a connection through local network 522 to a host computer 524 or to data equipment operated by an Internet Service Provider (ISP) 526. ISP 526 in turn provides data communication services through the worldwide packet data communication network now commonly referred to as the "Internet" 528. Local network 522 and Internet 528 both use electrical, electromagnetic or optical signals that carry digital data streams. The signals through the various networks and the signals on network link 420 and through communication interface 518, which carry the digital data to and from computer system 500, are exemplary forms of carrier waves transporting the information.

Computer system 500 can send messages and receive data, including program code, through the network(s), network link 420 and communication interface 518. In the Internet example, a server 530 might transmit a requested code for an application program through Internet 528, ISP 526, local network 522 and communication interface 518. The received code may be executed by processor 504 as it is received, and/or stored in storage device 510, or other non-volatile storage for later execution. In this manner, computer system 500 may obtain application code in the form of a carrier wave.

Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense. The invention includes other contexts and applications in which the mechanisms and processes described herein are available to other mechanisms, methods, programs, and processes.

In addition, in this disclosure, certain process steps are set forth in a particular order, and alphabetic and alphanumeric labels are used to identify certain steps. Unless specifically stated in the disclosure, embodiments of the invention are not limited to any particular order of carrying out such steps. In particular, the labels are used merely for convenient identification of steps, and are not intended to imply, specify or require a particular order of carrying out such steps. Furthermore, other embodiments may use more or fewer steps than those discussed herein.

What is claimed is:

1. A method for communicating data in a clustered computing system, the method comprising:
receiving an initial indication that an event was generated at a first node of the clustered computing system;
receiving one or more subsequent indications that the event was generated at the first node of the clustered computing system;
determining that information from the initial indication is identical to information from said one or more subsequent indications;
in response to determining that the information from the initial indication is identical to the information from said one or more subsequent indications, coalescing the information from the initial indication with the information from said one or more subsequent indications into a coalesced event notification; and
propagating the coalesced event notification to a receiving node of the clustered computing system.

2. The method of claim 1, wherein said clustered computing system comprises a database management system.

3. A computer-readable storage medium carrying one or more sequences of instructions, which when executed by one or more processors, causes the one or more processors to perform the method recited in claim 2.

4. The computing environment of claim 1, wherein said clustered computing system comprises a shared-disk database system.

5. A computer-readable storage medium carrying one or more sequences of instructions, which when executed by one or more processors, causes the one or more processors to perform the method recited in claim 4.

6. The computing environment of claim 1, wherein said clustered computing system comprises a shared-cache parallel database management system.

7. A computer-readable storage medium carrying one or more sequences of instructions, which when executed by one or more processors, causes the one or more processors to perform the method recited in claim 6.

8. The computing environment of claim 1, wherein said clustered computing system comprises a shared-nothing database management system.

9. A computer-readable storage medium carrying one or more sequences of instructions, which when executed by one or more processors, causes the one or more processors to perform the method recited in claim 8.

10. The computing environment of claim 1, wherein said clustered computing system comprises a distributed database management system.

11. A computer-readable storage medium carrying one or more sequences of instructions, which when executed by one or more processors, causes the one or more processors to perform the method recited in claim 10.

12. A computer-readable storage medium carrying one or more sequences of instructions, which when executed by one or more processors, causes the one or more processors to perform the method recited in claim 1.

13. A computer apparatus comprising:
a processor; and
a memory coupled to the processor, the memory containing one or more sequences of instructions for communicating data in a clustered computing environment, wherein execution of the one or more sequences of instructions by the processor causes the processor to perform the method of claim 1.

14. The method of claim 1, wherein the step of propagating comprises:
appending, onto an existing message, the coalesced event notification that includes information that describes a single instance of said event;
wherein the message is destined to be propagated to the receiving node, wherein the receiving node is not a node sending the message.

15. The method of claim 14, where the step of appending includes piggybacking the coalesced event notification on a message that is otherwise unrelated to the event.

16. A computer-readable storage medium carrying one or more sequences of instructions, which when executed by one or more processors, causes the one or more processors to perform the method recited in claim 15.

17. The method of claim 14, wherein the method further comprises:
setting an identifier indicating that the information describing an identical event is to be appended onto a message and propagated to a particular node.

18. The method of claim 14, wherein the message has a fixed size, and the method further comprises:
appending additional information that describes additional events onto existing message traffic until free space in the fixed-size message is filled.

19. A computer-readable storage medium carrying one or more sequences of instructions, which when executed by one or more processors, causes the one or more processors to perform the method recited in claim 18.

20. The method of claim 14, wherein the method further comprises:
placing the information describing an identical event in a queue.

21. The method of claim 20, wherein the queue includes at least a priority queuing mechanism in order to determine a priority for events such that high priority events would supercede a low priority event in the queue.

22. A computer-readable storage medium carrying one or more sequences of instructions, which when executed by one or more processors, causes the one or more processors to perform the method recited in claim 21.

23. The method of claim 14, wherein an in-memory hash index is used to determine if an event exists in a shared-memory event buffer.

24. The method of claim 23, wherein the shared-memory event buffer has a fixed size.

25. A computer-readable storage medium carrying one or more sequences of instructions, which when executed by one or more processors, causes the one or more processors to perform the method recited in claim 24.

26. The method of claim 14, wherein the method further comprises:
partitioning a shared-memory event buffer;
generating an event buffer entry of the shared memory event buffer;
placing an event identifier into the event buffer entry; and
inserting the information describing an identical event into the event buffer entry.

27. The method of claim 26, the method further comprising: if between a fastest head pointer and a tail pointer there does not exist a buffer entry in the shared memory event buffer for an identical event, generating a new event buffer entry, and wherein the inserting further comprises inserting the information describing said identical event into the new event buffer entry.

28. A computer-readable storage medium carrying one or more sequences of instructions, which when executed by one or more processors, causes the one or more processors to perform the method recited in claim 27.

29. The method of claim 26, wherein the inserting comprises: if between a fastest head pointer and a tail pointer there exists a buffer entry in the shared memory event buffer for the identical event, updating the buffer entry so that the buffer entry represents the subsequent occurrence.

30. A computer-readable storage medium carrying one or more sequences of instructions, which when executed by one or more processors, causes the one or more processors to perform the method recited in claim 29.

31. The method of claim 26, further comprising using a round robin method and the shared memory event buffer to determine to which existing message to append the information describing an identical event.

32. A computer-readable storage medium carrying one or more sequences of instructions, which when executed by one or more processors, causes the one or more processors to perform the method recited in claim 31.

33. The method of claim 14, wherein the method further comprises the step of:

maintaining information that describes a plurality of events.

34. The method of claim 33, wherein the method further comprises the step of:

maintaining information that describes the plurality of events in a shared-memory event buffer.

35. A method for communicating data in a clustered computing system, the method comprising:

receiving an indication that an event was generated at a first node of the clustered computing system;

receiving one or more subsequent indications that the event was generated at the first node of the clustered computing system;

determining that information from said indication is identical to information from said one or more subsequent indications;

in response to determining that the information from the initial indication is identical to the information from said one or more subsequent indications, coalescing the information from the initial indication with the information from said one or more subsequent indications into a coalesced event notification;

appending onto an existing message the coalesced event notification that describes a single instance of said event, wherein the message was destined to be propagated to a receiving node that is not a node sending the message; and propagating the coalesced event notification to the receiving node.

36. A computer-readable storage medium carrying one or more sequences of instructions, which when executed by one or more processors, causes the one or more processors to perform the method recited in claim 35.

* * * * *

UNITED STATES PATENT AND TRADEMARK OFFICE
CERTIFICATE OF CORRECTION

PATENT NO. : 7,647,595 B2
APPLICATION NO. : 10/697073
DATED : January 12, 2010
INVENTOR(S) : Sashikanth Chandrasekaran It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1622 days.

On page 2, in column 2, under "Other Publications", line 20, delete "Mangement" and insert -- Management --, therefor.

In column 5, line 61, delete "Propogation" and insert -- Propagation --, therefor.

In column 10, line 18, delete "round-robinned" and insert -- round-robined --, therefor.

Signed and Sealed this

Nineteenth Day of October, 2010

David J. Kappos
*Director of the United States Patent and Trademark Office*